(12) United States Patent
Shimamoto et al.

(10) Patent No.: US 11,484,949 B2
(45) Date of Patent: Nov. 1, 2022

(54) CUTTING INSERT AND CUTTING TOOL

(71) Applicants: SUMITOMO ELECTRIC HARDMETAL CORP., Itami (JP); HARTMETALL-WERKZEUGFABRIK PAUL HORN GMBH, Tuebingen (DE)

(72) Inventors: Yosuke Shimamoto, Itami (JP); Yasuyuki Kanada, Itami (JP); Matthias Luik, Reutlingen (DE)

(73) Assignees: SUMITOMO ELECTRIC HARDMETAL CORP., Itami (JP); HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 210 days.

(21) Appl. No.: 16/473,679

(22) PCT Filed: Oct. 10, 2018

(86) PCT No.: PCT/JP2018/037653
§ 371 (c)(1),
(2) Date: Jun. 26, 2019

(87) PCT Pub. No.: WO2020/075228
PCT Pub. Date: Apr. 16, 2020

(65) Prior Publication Data
US 2021/0086270 A1    Mar. 25, 2021

(51) Int. Cl.
*B23B 29/04*  (2006.01)
*B23B 27/00*  (2006.01)

(52) U.S. Cl.
CPC .......... *B23B 29/043* (2013.01); *B23B 27/007* (2013.01); *B23B 2200/161* (2013.01)

(58) Field of Classification Search
CPC . B23B 29/043; B23B 29/08; B23B 2220/123; B23B 2220/165;
(Continued)

(56) References Cited

U.S. PATENT DOCUMENTS

| 5,810,518 A | 9/1998 | Wiman et al. |
| 6,540,449 B1 * | 4/2003 | Bejerstål ................. B23C 5/10 |
| | | 407/40 |

(Continued)

FOREIGN PATENT DOCUMENTS

| AT | 007 664 U1 | 7/2005 |
| DE | 34 48 086 C2 | 12/1991 |

(Continued)

OTHER PUBLICATIONS

Description WO2006136338A1 (translation) https://worldwide.espacenet.com/ obtained at (last visited Aug. 6, 2021).*

*Primary Examiner* — Ryan Rufo
(74) *Attorney, Agent, or Firm* — Faegre Drinker Biddle & Reath LLP

(57) ABSTRACT

A cutting insert includes a cylindrical body portion, a cutting portion, a first fitting portion, a second fitting portion, and a third fitting portion. The cutting portion includes a rake face and a flank face. A ridgeline between the rake face and the flank face constitutes a cutting edge. When viewed in the axial direction, the cutting portion is provided opposite to the third fitting portion relative to the insertion hole. When viewed in the axial direction, a straight line extending through an outer circumferential end of the cutting edge and a center of the insertion hole overlaps with the third fitting portion and is located between the first fitting portion and the second fitting portion. A third central angle is smaller than a first central angle and is smaller than a second central angle.

9 Claims, 7 Drawing Sheets

(58) Field of Classification Search
CPC ........ B23B 2210/022; B23B 2200/161; B23C 3/28; B23C 3/34; B23C 2200/161; B23C 2200/165; B23C 2210/02; B23C 2220/36
See application file for complete search history.

(56) References Cited

U.S. PATENT DOCUMENTS

| | | | |
|---|---|---|---|
| 2004/0067112 A1* | 4/2004 | Blucher | ................. B23B 31/02 407/103 |
| 2005/0232710 A1 | 10/2005 | Schafer et al. | |
| 2012/0201616 A1* | 8/2012 | Hecht | .................... B23B 27/04 407/103 |
| 2013/0266384 A1* | 10/2013 | Hecht | .................... B23B 27/04 407/100 |
| 2020/0324345 A1* | 10/2020 | Maier | .................... B23B 29/04 |
| 2021/0016363 A1* | 1/2021 | Ando | .................... B23B 27/007 |

FOREIGN PATENT DOCUMENTS

| | | | | |
|---|---|---|---|---|
| GB | 1 255 494 A | 12/1971 | | |
| JP | 2002-512564 A | 4/2002 | | |
| JP | 2005-533663 A | 11/2005 | | |
| JP | 2016-221664 A | 12/2016 | | |
| KR | 10-2016-0020886 A | 2/2016 | | |
| WO | WO 98/50187 A2 | 11/1998 | | |
| WO | WO-2006136338 A1 * | 12/2006 | ........... B23B 27/007 | |
| WO | WO 2008/061761 A1 | 5/2008 | | |

\* cited by examiner

CUTTING INSERT AND CUTTING TOOL

TECHNICAL FIELD

The present disclosure relates to a cutting insert and a cutting tool.

BACKGROUND ART

German Patent No. 3448086 (Patent Literature 1) describes a cutting insert having three fitting portions each protruding in an axial direction and each extending in a radial direction.

CITATION LIST

Patent Literature

[PTL 1] German Patent No. 3448086

SUMMARY OF INVENTION

A cutting insert according to the present disclosure includes a cylindrical body portion, a cutting portion, a first fitting portion, a second fitting portion, and a third fitting portion. The cylindrical body portion has a first main surface, a second main surface, and an outer circumferential surface, the second main surface being opposite to the first main surface, the outer circumferential surface being continuous to each of the first main surface and the second main surface. The cylindrical body portion is provided with an insertion hole extending between the first main surface and the second main surface. The cutting portion protrudes from the outer circumferential surface in a radial direction. The first fitting portion, the second fitting portion, and the third fitting portion each protrude from the second main surface in an axial direction and each extend in the radial direction. The cutting portion includes a rake face and a flank face continuous to the rake face. A ridgeline between the rake face and the flank face constitutes a cutting edge. When viewed in the axial direction, the cutting portion is provided opposite to the third fitting portion relative to the insertion hole. When viewed in the axial direction, a straight line extending through an outer circumferential end of the cutting edge and a center of the insertion hole overlaps with the third fitting portion and is located between the first fitting portion and the second fitting portion. When viewed in the axial direction, assuming that a central angle between the second fitting portion and the third fitting portion represents a first central angle, a central angle between the third fitting portion and the first fitting portion represents a second central angle, and a central angle between the first fitting portion and the second fitting portion represents a third central angle, the third central angle is smaller than the first central angle and is smaller than the second central angle.

DESCRIPTION OF EMBODIMENTS

Figure 1:
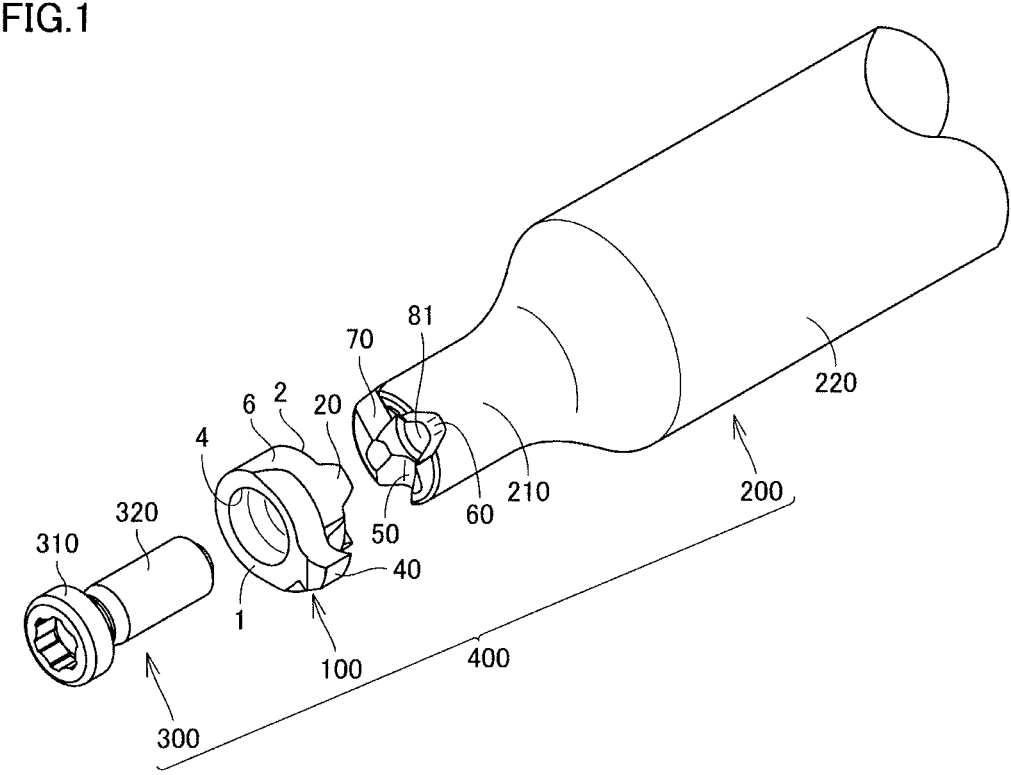
FIG. 1 is a schematic perspective exploded view showing a configuration of a cutting tool according to the present embodiment.

Problem to be Solved by the Present Disclosure

In the cutting insert described in German Patent No. 3448086, an amount of displacement at a cutting edge becomes large when the cutting insert is attached to a holder, disadvantageously.

The present disclosure has been made in the foregoing problem and has an object to provide a cutting insert and a cutting tool, by each of which an amount of displacement at a cutting edge can be reduced when the cutting insert is attached to a holder.

Advantageous Effect of the Present Disclosure

According to the present disclosure, there can be provided a cutting insert and a cutting tool, by each of which an amount of displacement at a cutting edge can be reduced when the cutting insert is attached to a holder.

Summary of Embodiments of the Present Disclosure

First, a summary of embodiments of the present disclosure will be listed and described.

(1) A cutting insert 100 according to the present disclosure includes a cylindrical body portion 6, a cutting portion 40, a first fitting portion 10, a second fitting portion 20, and a third fitting portion 30. Cylindrical body portion 6 has a first main surface 1, a second main surface 2, and an outer circumferential surface 3, second main surface 2 being opposite to first main surface 1, outer circumferential surface 3 being continuous to each of first main surface 1 and second main surface 2. Cylindrical body portion 6 is provided with an insertion hole 4 extending between first main surface 1 and second main surface 2. Cutting portion 40 protrudes from outer circumferential surface 3 in a radial direction. First fitting portion 10, second fitting portion 20, and third fitting portion 30 each protrude from second main surface 2 in an axial direction and each extend in the radial direction. Cutting portion 40 includes a rake face 41 and a flank face 42 continuous to rake face 41. A ridgeline between rake face 41 and flank face 42 constitutes a cutting edge 44. When viewed in the axial direction, cutting portion 40 is provided opposite to third fitting portion 30 relative to insertion hole 4. When viewed in the axial direction, a straight line extending through an outer circumferential end of cutting edge 44 and a center 5 of insertion hole 4 overlaps with third fitting portion 30 and is located between first fitting portion 10 and second fitting portion 20. When viewed in the axial direction, assuming that a central angle between second fitting portion 20 and third fitting portion 30 represents a first central angle θ1, a central angle between third fitting portion 30 and first fitting portion 10 represents a second central angle θ2, and a central angle between first fitting portion 10 and second fitting portion 20 represents a third central angle θ3, third central angle θ3 is smaller than first central angle θ1 and is smaller than second central angle θ2.

(2) In cutting insert 100 according to (1), third central angle θ3 may be more than or equal to 60° and less than or equal to 100°.

(3) In cutting insert 100 according to (1) or (2), first central angle θ1 may be more than or equal to 130° and less than or equal to 150°.

(4) In cutting insert 100 according to (1) or (2), second central angle θ2 may be more than or equal to 130° and less than or equal to 150°.

(5) In cutting insert 100 according to any one of (1) to (4), when viewed in the axial direction, an intermediate line of third fitting portion 30 may be located on a straight line bisecting third central angle θ3.

(6) In cutting insert 100 according to (5), the straight line bisecting third central angle θ3 may overlap with the straight line extending through the outer circumferential end of cutting edge 44 and center 5 of insertion hole 4.

(7) In cutting insert 100 according to any one of (1) to (6), flank face 42 may be continuous to outer circumferential surface 3.

(8) In cutting insert 100 according to any one of (1) to (6), a plane along flank face 42 may cross a straight line along the axial direction.

(9) A cutting tool 400 according to one embodiment of the present disclosure includes cutting insert 100 recited in any one of (1) to (8), a holder 200, and a fastening bolt 300. Holder 200 is provided with a first recess 50, a second recess 60, and a third recess 70, first recess 50 being configured to receive first fitting portion 10, second recess 60 being configured to receive second fitting portion 20, third recess 70 being configured to receive third fitting portion 30. Fastening bolt 300 is disposed in insertion hole 4 and is configured to fix cutting insert 100 to holder 200.

(10) In cutting tool 400 according to (9), first fitting portion 10 may have a first side surface portion 11, a second side surface portion 12, and a top surface portion 13, second side surface portion 12 being opposite to first side surface portion 11, top surface portion 13 being continuous to each of first side surface portion 11 and second side surface portion 12. First recess 50 may have a third side surface portion 51, a fourth side surface portion 52, and a bottom surface portion 53, fourth side surface portion 52 being opposite to third side surface portion 51, bottom surface portion 53 being continuous to each of third side surface portion 51 and fourth side surface portion 52. First side surface portion 11 may be in contact with third side surface portion 51. Second side surface portion 12 may be in contact with fourth side surface portion 52. Top surface portion 13 may be separated from bottom surface portion 53.

Details of Embodiments of the Present Disclosure

Next, the following describes details of the embodiments of the present disclosure with reference to figures. It should be noted that the same or corresponding portions in the figures are given the same reference characters. Moreover, at least a part of the embodiments described below may be appropriately combined.

<Cutting Tool>

Figure 2:
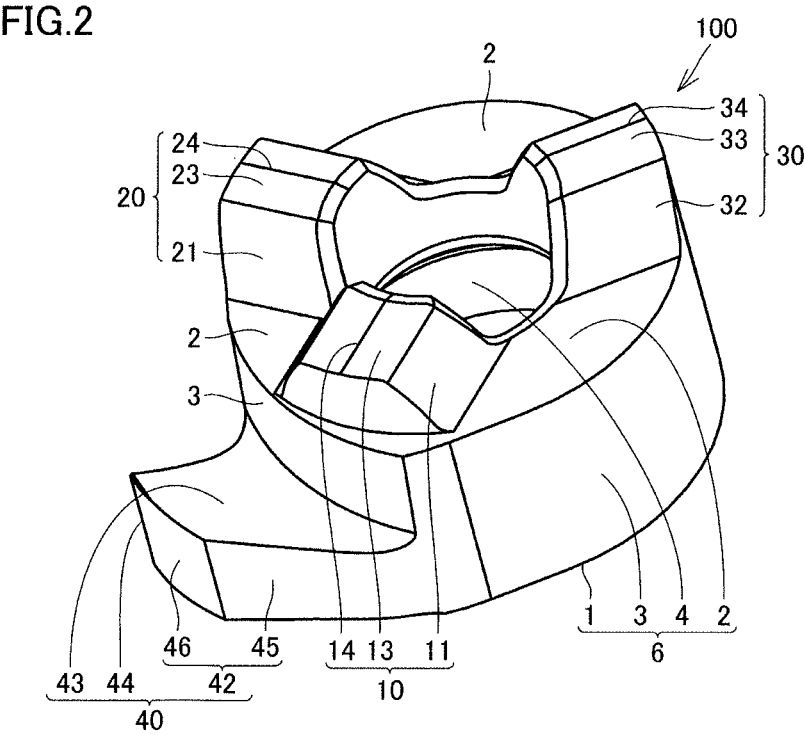
FIG. 2 is a schematic perspective view showing a configuration of a cutting insert according to a first embodiment.

First, the following describes a configuration of a cutting tool 400 according to the present embodiment. FIG. 1 is a schematic perspective exploded view showing the configuration of cutting tool 400 according to the present embodiment. FIG. 2 is a schematic perspective view showing a configuration of a cutting insert 100 according to a first embodiment.

As shown in FIG. 1, cutting tool 400 according to the present embodiment mainly has cutting insert 100, a holder 200, and a fastening bolt 300. As shown in FIG. 1 and FIG. 2, cutting insert 100 has a cutting portion 40 and a cylindrical body portion 6. As shown in FIG. 2, cutting portion 40 has a cutting edge 44. Cylindrical body portion 6 has a first main surface 1, a second main surface 2, an outer circumferential surface 3, and an insertion hole 4. Cutting portion 40 is continuous to outer circumferential surface 3. Cutting portion 40 protrudes from outer circumferential surface 3 in a radial direction. Insertion hole 4 extends between first main surface 1 and second main surface 2. Second main surface 2 is provided with a first fitting portion 10, a second fitting portion 20, and a third fitting portion 30.

As shown in FIG. 1, holder 200 has a first portion 210 and a second portion 220. Second portion 220 is continuous to first portion 210. Each of first portion 210 and second portion 220 is substantially cylindrical. The diameter of first portion 210 is smaller than the diameter of second portion 220. First portion 210 is provided with a first recess 50, a second recess 60, a third recess 70, and a fastening hole 81. First recess 50 is configured to receive first fitting portion 10. Second recess 60 is configured to receive second fitting portion 20. Third recess 70 is configured to receive third fitting portion 30.

Fastening bolt 300 is configured to fix cutting insert 100 to holder 200. Fastening bolt 300 is disposed in each of insertion hole 4 of cutting insert 100 and fastening hole 81 of holder 200. Fastening bolt 300 has a head 310 and a screw portion 320. Screw portion 320 is continuous to head 310. Head 310 has a cylindrical shape or a truncated cone shape, for example. The diameter of head 310 is larger than the diameter of screw portion 320. When screw portion 320 of fastening bolt 300 is fastened into fastening hole 81 of holder 200, first fitting portion 10, second fitting portion 20, and third fitting portion 30 are pressed against first recess 50, second recess 60, and third recess 70, respectively. Accordingly, cutting insert 100 is fixed to holder 200.

Cutting Insert

First Embodiment

Figure 3:
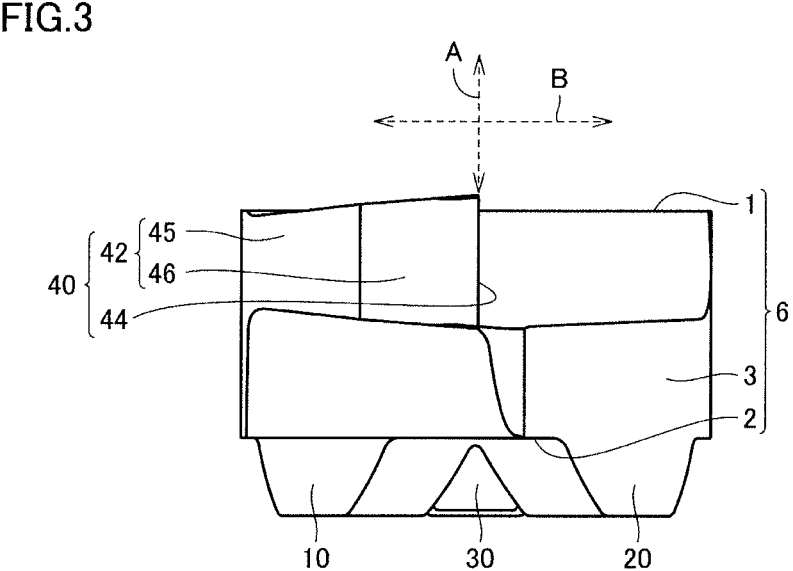
FIG. 3 is a schematic front view showing the configuration of the cutting insert according to the first embodiment.
Figure 4:
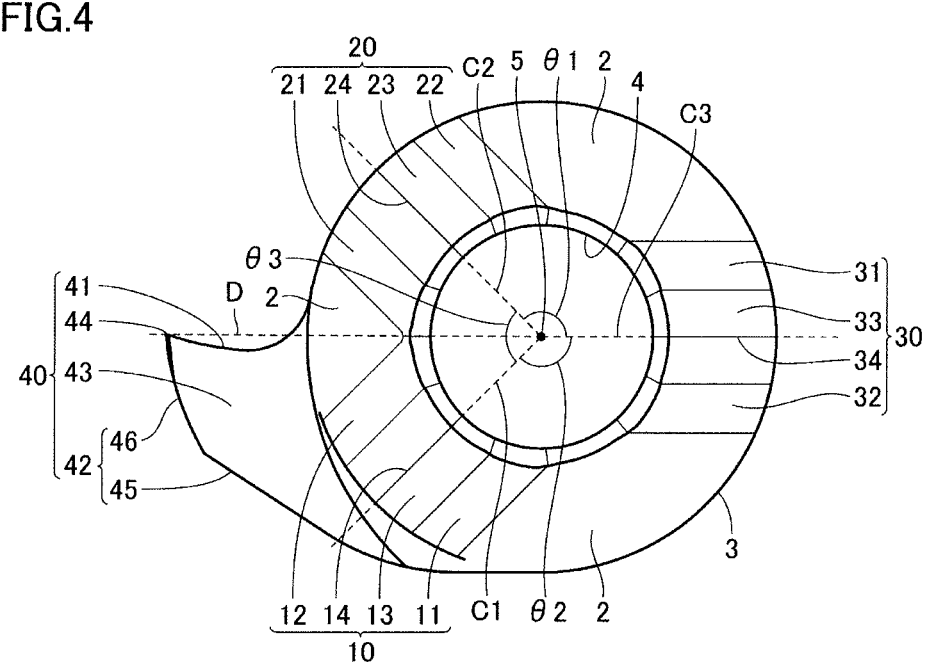
FIG. 4 is a schematic bottom view showing the configuration of the cutting insert according to the first embodiment.

Next, the following describes details of the configuration of cutting insert 100 according to the first embodiment. FIG. 3 is a schematic front view showing the configuration of cutting insert 100 according to the first embodiment. FIG. 4 is a schematic bottom view showing the configuration of cutting insert 100 according to the first embodiment.

As shown in FIG. 3, cutting insert 100 according to the first embodiment is a cutting insert 100 for fluting process. Second main surface 2 is a surface opposite to first main surface 1. Outer circumferential surface 3 is continuous to each of first main surface 1 and second main surface 2. Outer circumferential surface 3 extends in a direction crossing each of first main surface 1 and second main surface 2. Insertion hole 4 extends along axial direction A of cylindrical body portion 6. Each of first main surface 1 and second main surface 2 extends along a radial direction B of cylindrical body portion 6. Radial direction B is substantially perpendicular to axial direction A. First main surface 1 may be substantially parallel to second main surface 2.

As shown in FIG. 2, first fitting portion 10, second fitting portion 20, and third fitting portion 30 protrude from second main surface 2 in axial direction A. As shown in FIG. 3, first fitting portion 10, second fitting portion 20, and third fitting portion 30 are located opposite to first main surface 1 relative to second main surface 2. As shown in FIG. 2, first fitting portion 10, second fitting portion 20, and third fitting portion 30 extends in radial direction B. From another point of view, first fitting portion 10, second fitting portion 20, and third fitting portion 30 extend along a direction from outer circumferential surface 3 toward insertion hole 4.

As shown in FIG. 4, cutting portion 40 has a rake face 41 and a flank face 42. Flank face 42 is continuous to rake face 41. A ridgeline between rake face 41 and flank face 42 constitutes cutting edge 44. Cutting edge 44 is in the form of a straight line, for example. As shown in FIG. 3, cutting edge 44 may be substantially parallel to axial direction A. As shown in FIG. 3, when viewed in a direction parallel to first main surface 1, cutting edge 44 may cross first main surface 1.

As shown in FIG. 4, when viewed in axial direction A, a distance between the outer circumferential end of cutting edge 44 and center 5 of insertion hole 4 is longer than a distance between outer circumferential surface 3 of cylindrical body portion 6 and center 5. Flank face 42 has a first flank face portion 46 and a second flank face portion 45. First flank face portion 46 is continuous to rake face 41. Second flank face portion 45 is continuous to first flank face portion 46. First flank face portion 46 is located between rake face 41 and second flank face portion 45. Second flank face portion 45 is inclined relative to first flank face portion 46. Second flank face portion 45 is continuous to outer circumferential surface 3. Second flank face portion 45 is located between first flank face portion 46 and outer circumferential surface 3. Rake face 41 is continuous to outer circumferential surface 3.

As shown in FIG. 2, cutting portion 40 may further have a first end surface 43. First end surface 43 is continuous to rake face 41, first flank face portion 46, second flank face portion 45, and outer circumferential surface 3. In axial direction A, first end surface 43 is located between first main surface 1 and second main surface 2. As shown in FIG. 4, when viewed in axial direction A, cutting portion 40 is provided opposite to third fitting portion 30 relative to insertion hole 4. From another point of view, insertion hole 4 is located between cutting portion 40 and third fitting portion 30. When viewed in axial direction A, a straight line (fourth straight line D) extending through the outer circumferential end of cutting edge 44 and center 5 of insertion hole 4 overlaps with third fitting portion 30. Fourth straight line D is located between first fitting portion 10 and second fitting portion 20.

First fitting portion 10 has a first side surface portion 11, a second side surface portion 12, and a first top surface portion 13. Second side surface portion 12 is a surface opposite to first side surface portion 11. First top surface portion 13 is continuous to each of first side surface portion 11 and second side surface portion 12. Each of first side surface portion 11 and second side surface portion 12 is inclined relative to second main surface 2. First top surface portion 13 may be substantially parallel to second main surface 2. An intermediate line (first intermediate line 14) of first fitting portion 10 is located in the middle between a boundary line between first side surface portion 11 and first top surface portion 13 and a boundary line between second side surface portion 12 and first top surface portion 13, for example. A straight line (first straight line C1) along first intermediate line 14 extends through center 5 of insertion hole 4. A space between first side surface portion 11 and second side surface portion 12 is narrower as it extends from second main surface 2 toward first top surface portion 13.

Second fitting portion 20 has a fifth side surface portion 21, a sixth side surface portion 22, and a second top surface portion 23. Sixth side surface portion 22 is a surface opposite to fifth side surface portion 21. Second top surface portion 23 is continuous to each of fifth side surface portion 21 and sixth side surface portion 22. Each of fifth side surface portion 21 and sixth side surface portion 22 is inclined relative to second main surface 2. Second top surface portion 23 may be substantially parallel to second main surface 2. An intermediate line (second intermediate line 24) of second fitting portion 20 is located in the middle between a boundary line between fifth side surface portion 21 and second top surface portion 23 and a boundary line between sixth side surface portion 22 and second top surface portion 23, for example. A straight line (second straight line C2) along second intermediate line 24 extends through center 5 of insertion hole 4. A space between fifth side surface portion 21 and sixth side surface portion 22 is narrower as it extends from second main surface 2 toward second top surface portion 23.

Third fitting portion 30 has a ninth side surface portion 31, a tenth side surface portion 32, and a third top surface portion 33. Tenth side surface portion 32 is a surface opposite to ninth side surface portion 31. Third top surface portion 33 is continuous to each of ninth side surface portion 31 and tenth side surface portion 32. Each of ninth side surface portion 31 and tenth side surface portion 32 is inclined relative to second main surface 2. Third top surface portion 33 may be substantially parallel to second main surface 2. An intermediate line (third intermediate line 34) of third fitting portion 30 is located in the middle between a boundary line between ninth side surface portion 31 and third top surface portion 33 and a boundary line between tenth side surface portion 32 and third top surface portion 33, for example. A straight line (third straight line C3) along third intermediate line 34 extends through center 5 of insertion hole 4. A space between ninth side surface portion 31 and tenth side surface portion 32 is narrower as it extends from second main surface 2 toward third top surface portion 33.

As shown in FIG. 4, when viewed in axial direction A, assuming that a central angle between second fitting portion 20 and third fitting portion 30 represents a first central angle $\theta1$, a central angle between third fitting portion 30 and first fitting portion 10 represents a second central angle $\theta2$, and a central angle between first fitting portion 10 and second fitting portion 20 represents a third central angle $\theta3$, third central angle $\theta3$ is smaller than first central angle $\theta1$ and is smaller than second central angle $\theta2$. A total of first central angle $\theta1$, second central angle $\theta2$, and third central angle $\theta3$ is 360°. First central angle $\theta1$ is an angle formed between the straight line (second straight line C2) along second intermediate line 24 and the straight line (third straight line C3) along third intermediate line 34. Second central angle $\theta2$ is an angle formed between the straight line (first straight line C1) along first intermediate line 14 and the straight line (third straight line C3) along third intermediate line 34. Third central angle θ3 is an angle formed between the straight line (first straight line C1) along first intermediate line 14 and the straight line (second straight line C2) along second intermediate line 24.

First central angle θ1 is 135°, for example. First central angle θ1 is more than or equal to 130° and less than or equal to 150°, for example. First central angle θ1 may be more than or equal to 132° or may be more than or equal to 134°. First central angle θ1 may be less than or equal to 143° or may be less than or equal to 141°.

Second central angle θ2 is 135°, for example. The second central angle θ2 may be more than or equal to 130° and less than or equal to 150°, for example. Second central angle θ2 may be more than or equal to 132° or may be more than or equal to 134°. Second central angle θ2 may be less than or equal to 143° or may be less than or equal to 141°.

Third central angle θ3 is 90°, for example. Third central angle θ3 may be more than or equal to 60° and less than or equal to 100°. Third central angle θ3 may be more than or equal to 82°, or may be more than or equal to 84°. Third central angle θ3 may be less than or equal to 98° or may be less than or equal to 96°.

As shown in FIG. 4, when viewed in axial direction A, the intermediate line (third intermediate line 34) of third fitting portion 30 is located on a straight line bisecting third central angle θ3, for example. The straight line bisecting third central angle θ3 may overlap with the straight line (fourth straight line D) extending through the outer circumferential end of cutting edge 44 and center 5 of insertion hole 4. That is, the straight line (fourth straight line D) extending through the outer circumferential end of cutting edge 44 and center 5 of insertion hole 4 may overlap with third intermediate line 34. From another point of view, when viewed in axial direction A, the straight line (fourth straight line D) extending through the outer circumferential end of cutting edge 44 and center 5 of insertion hole 4 may overlap with third top surface portion 33 of third fitting portion 30.

Figure 5:
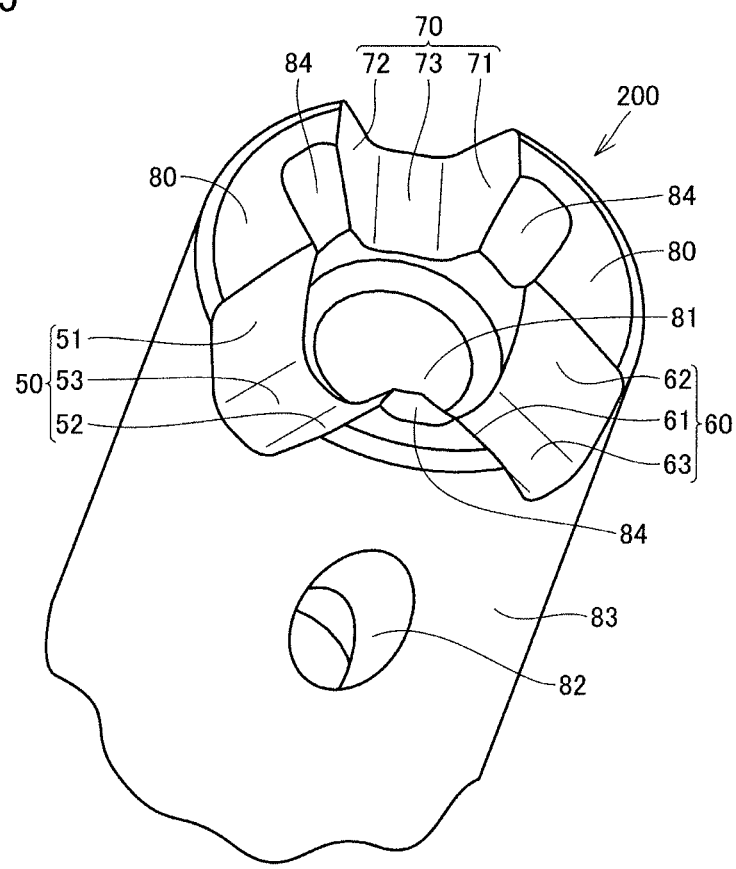
FIG. 5 is a schematic perspective view showing a configuration of a holder of the cutting tool according to the present embodiment.

FIG. 5 is a schematic perspective view showing a configuration of holder 200 of cutting tool 400 according to the present embodiment. As shown in FIG. 5, holder 200 has a tip surface 80, a cylindrical surface 83, and a coolant supplying hole 82. Tip surface 80 of holder 200 is disposed to face second main surface 2 of cutting insert 100. Coolant supplying hole 82 is opened to cylindrical surface 83. Coolant may be released from coolant supplying hole 82 toward cutting edge 44.

As described above, holder 200 is provided with first recess 50, second recess 60, and third recess 70. Each of first recess 50, second recess 60, and third recess 70 is continuous to each of tip surface 80 and cylindrical surface 83. First recess 50 has a third side surface portion 51, a fourth side surface portion 52, and a first bottom surface portion 53. Fourth side surface portion 52 is a surface opposite to third side surface portion 51. First bottom surface portion 53 is continuous to each of third side surface portion 51 and fourth side surface portion 52. Each of third side surface portion 51 and fourth side surface portion 52 is inclined relative to tip surface 80. First bottom surface portion 53 may be substantially parallel to tip surface 80. A space between third side surface portion 51 and fourth side surface portion 52 is wider as it extends from first bottom surface portion 53 toward tip surface 80.

Second recess 60 has a seventh side surface portion 61, an eighth side surface portion 62, and a second bottom surface portion 63. Eighth side surface portion 62 is a surface opposite to seventh side surface portion 61. Second bottom surface portion 63 is continuous to each of seventh side surface portion 61 and eighth side surface portion 62. Each of seventh side surface portion 61 and eighth side surface portion 62 is inclined relative to tip surface 80. Second bottom surface portion 63 may be substantially parallel to tip surface 80. A space between seventh side surface portion 61 and eighth side surface portion 62 is wider as it extends from second bottom surface portion 63 toward tip surface 80.

Third recess 70 has an eleventh side surface portion 71, a twelfth side surface portion 72, and a third bottom surface portion 73. Twelfth side surface portion 72 is a surface opposite to eleventh side surface portion 71. Third bottom surface portion 73 is continuous to each of eleventh side surface portion 71 and twelfth side surface portion 72. Each of eleventh side surface portion 71 and twelfth side surface portion 72 is inclined relative to tip surface 80. Third bottom surface portion 73 may be substantially parallel to tip surface 80. A space between eleventh side surface portion 71 and twelfth side surface portion 72 is wider as it extends from third bottom surface portion 73 toward tip surface 80. A notch 84 may be provided between third recess 70 and second recess 60. Similarly, notch 84 may be provided between third recess 70 and first recess 50. Similarly, notch 84 may be provided between second recess 60 and first recess 50.

Figure 6:
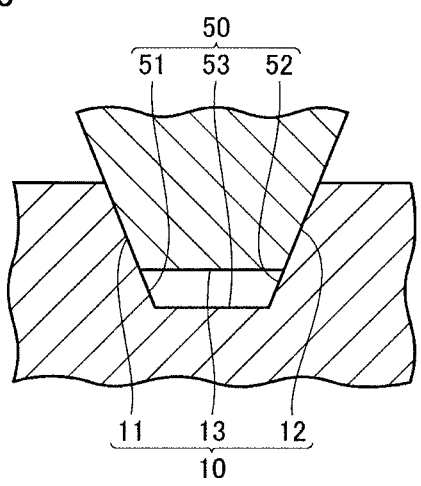
FIG. 6 is a schematic view showing a fitting state between the cutting insert and the holder.

FIG. 6 is a schematic view showing a fitting state between cutting insert 100 and holder 200. As shown in FIG. 6, when cutting insert 100 is fixed to holder 200, first side surface portion 11 is in contact with third side surface portion 51. Second side surface portion 12 is in contact with fourth side surface portion 52. First top surface portion 13 is separated from first bottom surface portion 53. Similarly, fifth side surface portion 21 is in contact with seventh side surface portion 61. Sixth side surface portion 22 is in contact with eighth side surface portion 62. Second top surface portion 23 is separated from second bottom surface portion 63. Similarly, ninth side surface portion 31 is in contact with eleventh side surface portion 71. Tenth side surface portion 32 is in contact with twelfth side surface portion 72. Third top surface portion 33 is separated from third bottom surface portion 73. Since the cutting insert is attached to the holder with the side surface portion of the fitting portion being in contact with the side surface portion of the recess without bringing the bottom surface portion of the fitting portion into contact with the bottom surface portion of the recess in this way, occurrence of positional deviation of the cutting edge in the circumferential direction can be suppressed.

Second Embodiment

Figure 7:
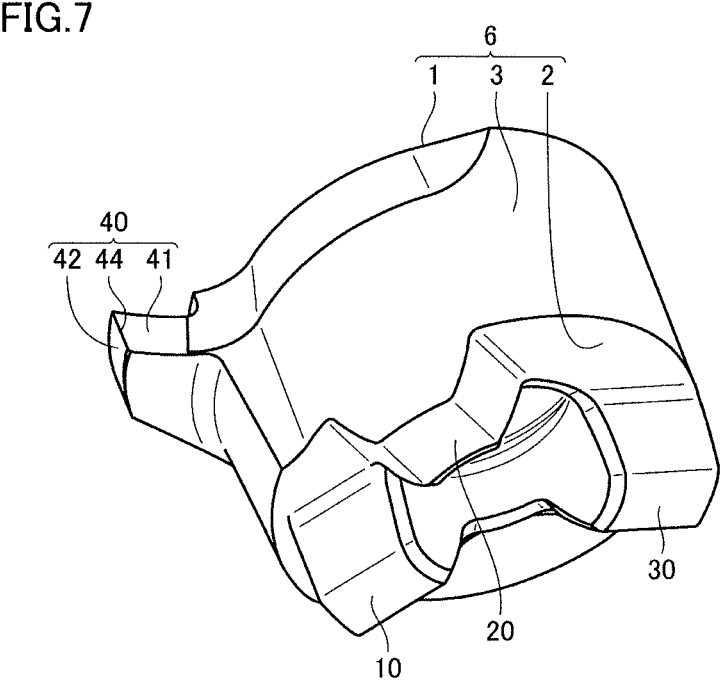
FIG. 7 is a schematic perspective view showing a configuration of a cutting insert according to a second embodiment.

Next, the following describes a configuration of a cutting insert 100 according to a second embodiment. FIG. 7 is a schematic perspective view showing the configuration of cutting insert 100 according to the second embodiment.

As shown in FIG. 7, cutting insert 100 according to the second embodiment is different from cutting insert 100 according to the first embodiment in terms of the configuration of cutting portion 40, and the other configuration of cutting insert 100 according to the second embodiment is substantially the same as that of cutting insert 100 according to the first embodiment. The following mainly describes the configuration different from that of cutting insert 100 according to the first embodiment.

As shown in FIG. 7, the length of cutting edge 44 of cutting insert 100 according to the second embodiment is shorter than the length of cutting edge 44 of cutting insert 100 according to the first embodiment. The area of rake face 41 of cutting insert 100 according to the second embodiment is smaller than the area of rake face 41 of cutting insert 100 according to the first embodiment. The area of flank face 42 of cutting insert 100 according to the second embodiment is smaller than the area of flank face 42 of cutting insert 100 according to the first embodiment.

Third Embodiment

Figure 8:
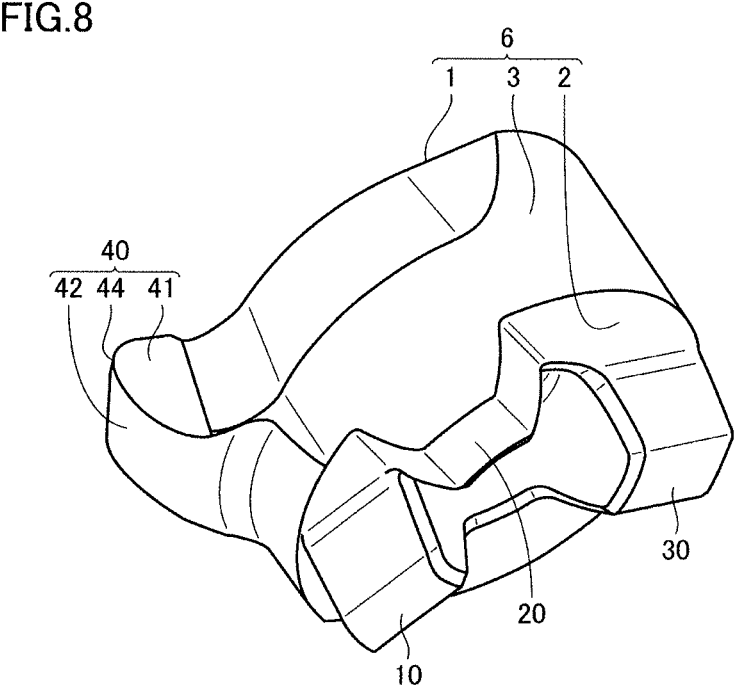
FIG. 8 is a schematic perspective view showing a configuration of a cutting insert according to a third embodiment.

Next, the following describes a configuration of a cutting insert 100 according to a third embodiment. FIG. 8 is a schematic perspective view showing the configuration of cutting insert 100 according to the third embodiment.

As shown in FIG. 8, cutting insert 100 according to the third embodiment is different from cutting insert 100 according to the first embodiment in terms of the configuration of cutting portion 40, and the other configuration of cutting insert 100 according to the third embodiment is substantially the same as that of cutting insert 100 according to the first embodiment. The following mainly describes the configuration different from that of cutting insert 100 according to the first embodiment.

Cutting insert 100 according to the third embodiment is a cutting insert 100 for profile process (full radius). As shown in FIG. 8, cutting edge 44 of cutting insert 100 according to the third embodiment has a curved shape. Cutting edge 44 may have an arc shape, for example. Flank face 42 of cutting insert 100 according to the third embodiment has a curved shape.

Fourth Embodiment

Figure 9:
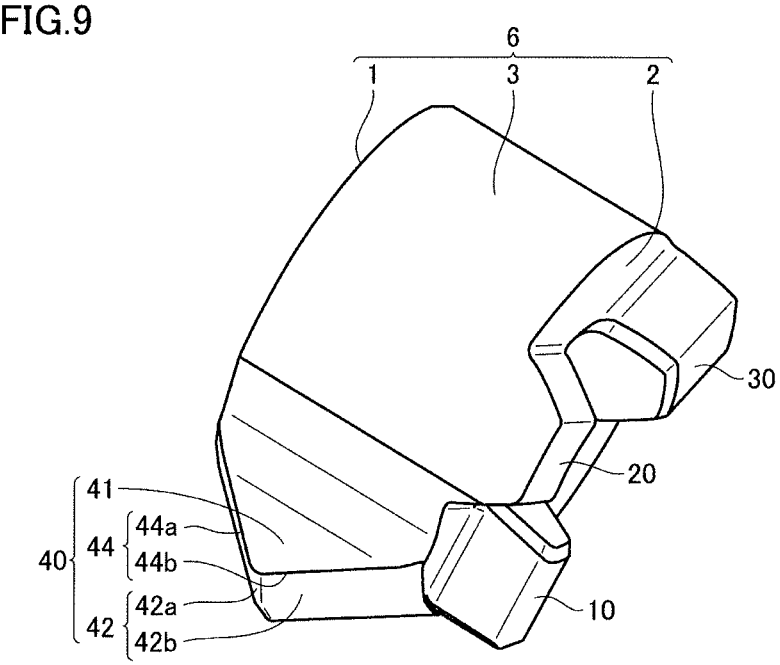
FIG. 9 is a schematic perspective view showing a configuration of a cutting insert according to a fourth embodiment.

Next, the following describes a configuration of a cutting insert 100 according to a fourth embodiment. FIG. 9 is a schematic perspective view showing the configuration of cutting insert 100 according to the fourth embodiment.

As shown in FIG. 9, cutting insert 100 according to the fourth embodiment is different from cutting insert 100 according to the first embodiment in terms of the configuration of cutting portion 40, and the other configuration of cutting insert 100 according to the fourth embodiment is substantially the same as that of cutting insert 100 according to the first embodiment. The following mainly describes the configuration different from that of cutting insert 100 according to the first embodiment.

Cutting insert 100 according to the fourth embodiment is a cutting insert 100 for chamfering process. As shown in FIG. 9, cutting edge 44 of cutting insert 100 according to the fourth embodiment may have a first cutting edge portion 44a and a second cutting edge portion 44b. Each of first cutting edge portion 44a and second cutting edge portion 44b is substantially in the form of straight line. First cutting edge portion 44a is inclined relative to second cutting edge portion 44b. Each of first cutting edge portion 44a and second cutting edge portion 44b is inclined relative to the straight line parallel to axial direction A.

Flank face 42 of cutting insert 100 according to the fourth embodiment has a third flank face portion 42a and a fourth flank face portion 42b. Fourth flank face portion 42b is continuous to third flank face portion 42a. Fourth flank face portion 42b is inclined relative to third flank face portion 42a. Third flank face portion 42a may be continuous to first main surface 1. Fourth flank face portion 42b may be continuous to second main surface 2. A ridgeline between third flank face portion 42a and rake face 41 constitutes first cutting edge portion 44a. A ridgeline between fourth flank face portion 42b and rake face 41 constitutes second cutting edge portion 44b.

Fifth Embodiment

Figure 10:
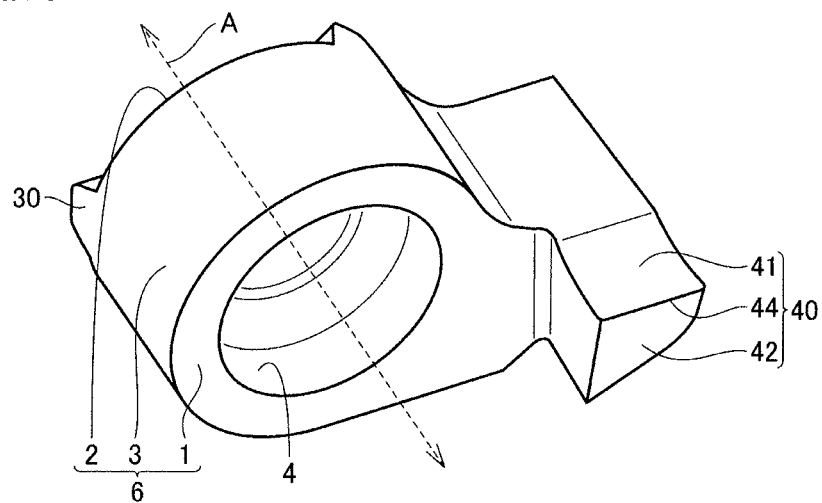
FIG. 10 is a schematic perspective view showing a configuration of a cutting insert according to a fifth embodiment.

Next, the following describes a configuration of a cutting insert 100 according to a fifth embodiment. FIG. 10 is a schematic perspective view showing the configuration of cutting insert 100 according to the fifth embodiment.

As shown in FIG. 10, cutting insert 100 according to the fifth embodiment is different from cutting insert 100 according to the first embodiment in terms of the configuration of cutting portion 40, and the other configuration of cutting insert 100 according to the fifth embodiment is substantially the same as that of cutting insert 100 according to the first embodiment. The following mainly describes the configuration different from that of cutting insert 100 according to the first embodiment.

Cutting insert 100 according to the fifth embodiment is a cutting insert 100 for end-surface process. As shown in FIG. 10, cutting portion 40 of cutting insert 100 according to the fifth embodiment protrudes from outer circumferential surface 3 in radial direction B and also protrudes from first main surface 1 in axial direction A. Cutting edge 44 extends in a direction substantially parallel to first main surface 1. Cutting edge 44 may extend in the direction crossing a straight line along axial direction A. A plane along flank face 42 crosses the straight line along axial direction A. Flank face 42 may be substantially parallel to first main surface 1. In axial direction A, flank face 42 is located opposite to second main surface 2 relative to first main surface 1. From another point of view, in axial direction A, first main surface 1 is located between flank face 42 and second main surface 2.

Sixth Embodiment

Figure 11:
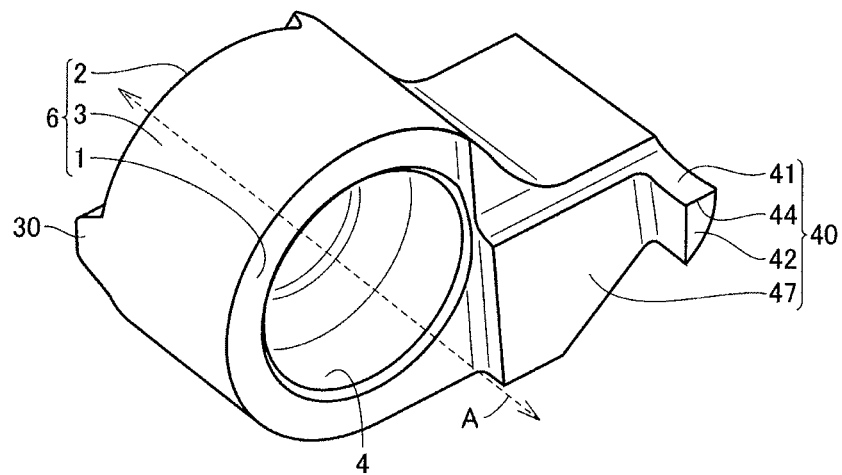
FIG. 11 is a schematic perspective view showing a configuration of a cutting insert according to a sixth embodiment.

Next, the following describes a configuration of cutting insert 100 according to a sixth embodiment. FIG. 11 is a schematic perspective view showing the configuration of cutting insert 100 according to the sixth embodiment.

As shown in FIG. 11, cutting insert 100 according to the sixth embodiment is different from cutting insert 100 according to the fifth embodiment in terms of the configuration of cutting portion 40, and the other configuration of cutting insert 100 according to the sixth embodiment is substantially the same as that of cutting insert 100 according to the fifth embodiment. The following mainly describes the configuration different from that of cutting insert 100 according to the fifth embodiment.

As shown in FIG. 11, the length of cutting edge 44 of cutting insert 100 according to the sixth embodiment is shorter than the length of cutting edge 44 of cutting insert 100 according to the fifth embodiment. The area of rake face 41 of cutting insert 100 according to the sixth embodiment is smaller than the area of rake face 41 of cutting insert 100 according to the fifth embodiment. The area of flank face 42 of cutting insert 100 according to the sixth embodiment is smaller than the area of flank face 42 of cutting insert 100 according to the fifth embodiment. Cutting portion 40 of cutting insert 100 according to the sixth embodiment may have a second end surface 47. Second end surface 47 may be substantially parallel to flank face 42. In axial direction A, second end surface 47 is located between flank face 42 and first main surface 1.

Next, the following describes function and effect of cutting insert 100 and cutting tool 400 according to each of the above-described embodiments.

According to cutting insert 100 according to each of the above-described embodiments, when viewed in axial direction A, cutting portion 40 is provided opposite to third fitting portion 30 relative to insertion hole 4. When viewed in axial direction A, the straight line extending through the outer circumferential end of cutting edge 44 and center 5 of insertion hole 4 overlaps with third fitting portion 30 and is located between first fitting portion 10 and second fitting portion 20. When viewed in axial direction A, assuming that the central angle between second fitting portion 20 and third fitting portion 30 represents first central angle θ1, the central angle between third fitting portion 30 and first fitting portion 10 represents second central angle θ2, and the central angle between first fitting portion 10 and second fitting portion 20 represents third central angle θ3, third central angle θ3 is smaller than first central angle θ1 and is smaller than second central angle θ2. Accordingly, an amount of displacement at the cutting edge can be reduced when cutting insert 100 is attached to holder 200. Moreover, with the increased precision of position of the cutting edge, cutting insert 100 according to the present embodiment can be applied to a process that requires a particularly high degree of precision. Furthermore, vibrations during cutting can be suppressed, thereby improving precision of processing and tool life.

According to cutting tool 400 according to each of the above-described embodiments, first side surface portion 11 is in contact with third side surface portion 51. Second side surface portion 12 is in contact with fourth side surface portion 52. Top surface portion 13 is separated from bottom surface portion 53. Since the cutting insert is attached to the holder with the side surface portion of the fitting portion being in contact with the side surface portion of the recess without bringing the bottom surface portion of the fitting portion into contact with the bottom surface portion of the recess in this way, occurrence of positional deviation of the cutting edge in the circumferential direction can be suppressed.

EXAMPLES (Sample Preparation)

Figure 12:
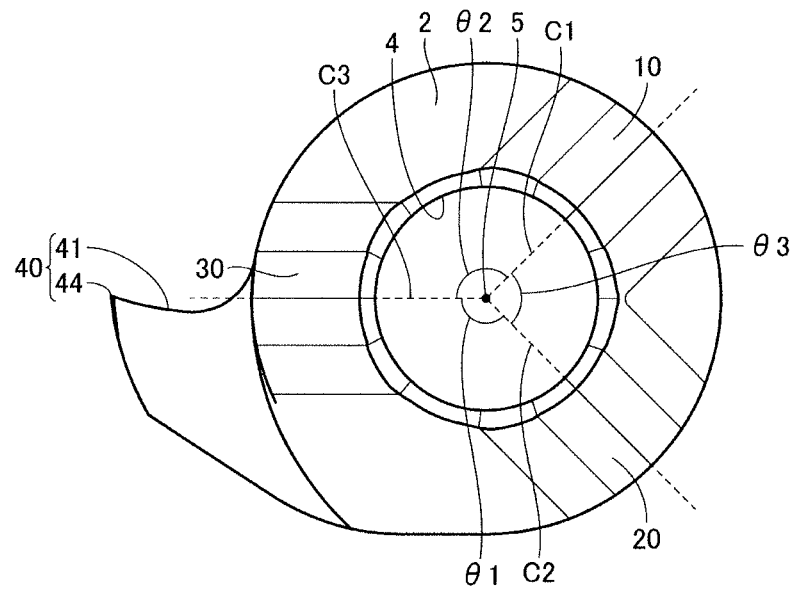
FIG. 12 is a schematic bottom view showing a configuration of a cutting insert according to a sample 7.
Figure 13:
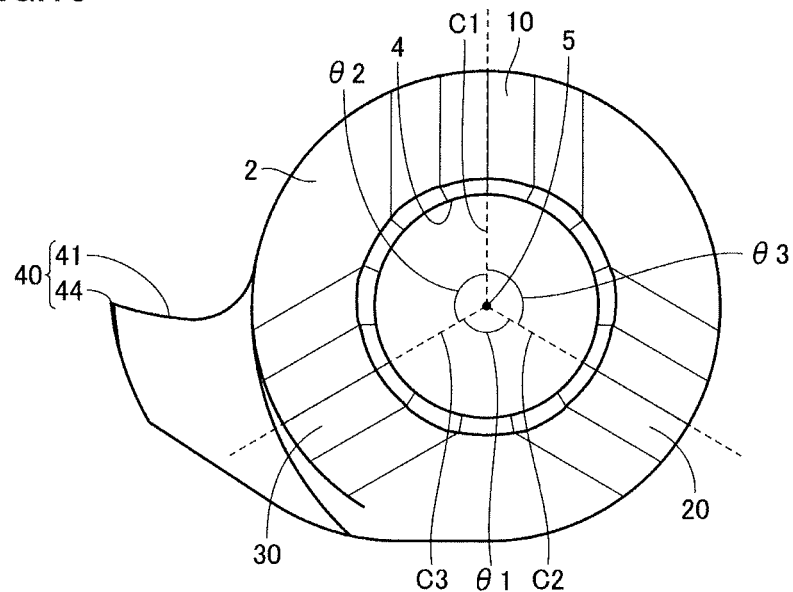
FIG. 13 is a schematic bottom view showing a configuration of a cutting insert according to a sample 8.

First, cutting inserts 100 according to samples 1 to 8 were prepared. As cutting insert 100 according to each of samples 1 to 6, cutting insert 100 shown in FIG. 4 was used. As shown in FIG. 4, in cutting insert 100 according to each of samples 1 to 6, third fitting portion 30 is located opposite to cutting portion 40 relative to insertion hole 4. The straight line bisecting third central angle θ3 overlaps with the straight line extending through the outer circumferential end of cutting edge 44 and center 5 of insertion hole 4. FIG. 12 is a schematic bottom view showing a configuration of cutting insert 100 according to sample 7. As shown in FIG. 12, in cutting insert 100 according to sample 7, third fitting portion 30 is located between insertion hole 4 and cutting portion 40. The straight line bisecting third central angle θ3 overlaps with the straight line extending through the outer circumferential end of cutting edge 44 and center 5 of insertion hole 4. FIG. 13 is a schematic bottom view showing a configuration of cutting insert 100 according to sample 8. As shown in FIG. 13, in cutting insert 100 according to sample 8, third fitting portion 30 is located between insertion hole 4 and cutting portion 40. The straight line bisecting third central angle θ3 is inclined relative to the straight line extending through the outer circumferential end of cutting edge 44 and center 5 of insertion hole 4.

In cutting insert 100 according to sample 1, first central angle θ1 was set to 120°, second central angle θ2 was set to 120°, and third central angle θ3 was set to 120°. In cutting insert 100 according to sample 2, first central angle θ1 was set to 125°, second central angle θ2 was set to 125°, and third central angle θ3 was set to 110°. In cutting insert 100 according to sample 3, first central angle θ1 was set to 130°, second central angle θ2 was set to 130°, and third central angle θ3 was set to 100°. In cutting insert 100 according to sample 4, first central angle θ1 was set to 135°, second central angle θ2 was set to 135°, and third central angle θ3 was set to 90°. In cutting insert 100 according to sample 5, first central angle θ1 was set to 140°, second central angle θ2 was set to 140°, and third central angle θ3 was set to 80°. In cutting insert 100 according to sample 6, first central angle θ1 was set to 150°, second central angle θ2 was set to 150°, and third central angle θ3 was set to 60°. In cutting insert 100 according to sample 7, first central angle θ1 was set to 135°, second central angle θ2 was set to 135°, and third central angle θ3 was set to 90°. In cutting insert 100 according to sample 8, first central angle θ1 was set to 120°, second central angle θ2 was set to 120°, and third central angle θ3 was set to 120°.

(Analysis Method)

Figure 14:
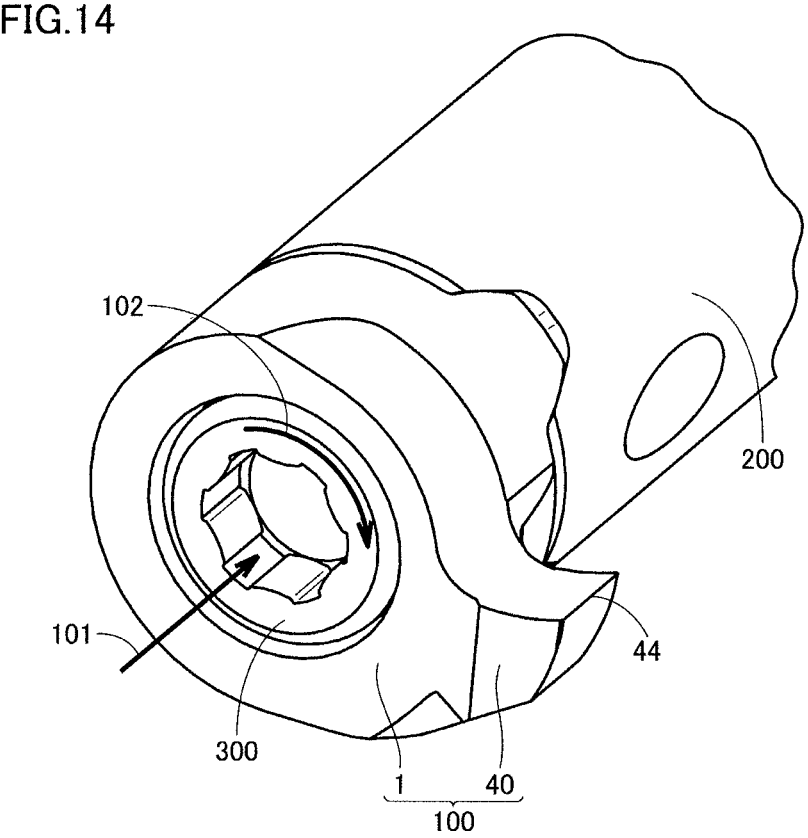
FIG. 14 is a schematic perspective view showing a state in which the cutting insert is attached to the holder using a fastening bolt.

FIG. 14 is a schematic perspective view showing a state in which cutting insert 100 is attached to holder 200 using the fastening bolt. Torque along fastening direction 102 of fastening bolt 300 was set to 2 N. Axial force in an insertion direction 101 of fastening bolt 300 was set to 750 N. By performing finite element method (FEM) analysis, amounts of displacement from original positions were calculated. For the amounts of displacement, an amount of displacement at the position of the cutting edge and the maximum amount of displacement among the amounts of displacement at all the positions of cutting insert 100 were calculated. Each of the amounts of displacement is the absolute value of an amount of displacement from the original model. It should be noted that in order to stabilize the position of the cutting edge when cutting insert 100 is attached to holder 200, it is more important to reduce the amount of displacement at the cutting edge than to reduce the maximum amount of displacement.

(Analysis Result)

TABLE 1

| Sample Number | Angle | | | Amount of Displacement (mm) | |
| --- | --- | --- | --- | --- | --- |
| | θ1 | θ2 | θ3 | Cutting Edge | Maximum |
| Sample 1 | 120° | 120° | 120° | 0.015 | 0.0150 |
| Sample 2 | 125° | 125° | 110° | 0.012 | 0.0149 |
| Sample 3 | 130° | 130° | 100° | 0.010 | 0.0151 |
| Sample 4 | 135° | 135° | 90° | 0.010 | 0.0163 |
| Sample 5 | 140° | 140° | 80° | 0.009 | 0.0168 |
| Sample 6 | 150° | 150° | 60° | 0.008 | 0.0180 |
| Sample 7 | 135° | 135° | 90° | 0.0175 | 0.0175 |
| Sample 8 | 120° | 120° | 120° | 0.014 | 0.0141 |

The amounts of displacement (mm) at the cutting edges of cutting inserts 100 according to samples 1 to 8 were 0.015, 0.012, 0.010, 0.010, 0.009, 0.008, 0.0175, and 0.014, respectively. The maximum amounts of displacement (mm) in cutting inserts 100 according to samples 1 to 8 were 0.0150, 0.0149, 0.0151, 0.0163, 0.0168, 0.0180, 0.0175 and 0.0141, respectively.

Each of cutting inserts 100 according to samples 1 and 8 is an equally divided cutting insert 100 (in which first central angle θ1 to third central angle θ3 are equal to one another). On the other hand, each of cutting inserts 100 according to samples 2 to 6 is an unequally divided cutting insert 100 in which the cutting edge is disposed at the narrow angle side. As shown in Table 1, the amount of displacement at the cutting edge of cutting insert 100 according to each of samples 2 to 6 was smaller than the amount of displacement at the cutting edge of cutting insert 100 according to each of samples 1 and 8. That is, it was confirmed that the amount of displacement at the cutting edge can be reduced by employing unequally divided cutting insert 100.

Cutting insert 100 according to sample 4 is a cutting insert 100 in which third fitting portion 30 is opposite to cutting portion 40 relative to insertion hole 4 (from another point of view, the cutting edge is located at the narrow angle side). On the other hand, cutting insert 100 according to sample 7 is a cutting insert 100 in which third fitting portion 30 is at the same side as cutting portion 40 relative to insertion hole 4 (from another point of view, the cutting edge is located opposite to the narrow angle side). As shown in Table 1, the amount of displacement at the cutting edge of cutting insert 100 according to sample 4 was smaller than the amount of displacement at the cutting edge of cutting insert 100 according to sample 7. That is, it was confirmed that the amount of displacement at the cutting edge can be reduced by disposing the cutting edge at the narrow angle side.

Among cutting inserts 100 according to samples 1 to 6, the angles of third central angles θ3 differ from one another. As shown in Table 1, it was confirmed that as third central angle θ3 becomes smaller, the maximum amount of displacement becomes larger but the amount of displacement at the cutting edge becomes smaller. It is difficult to design cutting insert 100 in which third central angle θ3 is less than 60°. Hence, third central angle θ3 is desirably more than or equal to 60° and less than or equal to 110°. In consideration of the maximum amount of displacement and the design, third central angle θ3 is more desirably more than or equal to 80° and less than or equal to 100°.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first main surface; 2: second main surface; 3: outer circumferential surface; 4: insertion hole; 5: center; 6: cylindrical body portion; 10: first fitting portion; 11: first side surface portion; 12: second side surface portion; 13: first top surface portion (top surface portion); 14: first intermediate line; 20: second fitting portion; 21: fifth side surface portion; 22: sixth side surface portion; 23: second top surface portion; 24: second intermediate line; 30: third fitting portion; 31: ninth side surface portion; 32: tenth side surface portion; 33: third top surface portion; 34: third intermediate line; 40: cutting portion; 41: rake face; 42: flank face; 42a: third flank face portion; 42b: fourth flank face portion; 43: first end surface; 44: cutting edge; 44a: first cutting edge portion; 44b: second cutting edge portion; 45: second flank face portion; 46: first flank face portion; 47: second end surface; 50: first recess; 51: third side surface portion; 52: fourth side surface portion; 53: first bottom surface portion (bottom surface portion); 60: second recess; 61: seventh side surface portion; 62: eighth side surface portion; 63: second bottom surface portion; 70: third recess; 71: eleventh side surface portion; 72: twelfth side surface portion; 73: third bottom surface portion; 80: tip surface; 81: fastening hole; 82: coolant supplying hole; 83: cylindrical surface; 84: notch; 100: cutting insert; 101: insertion direction; 102: fastening direction; 200: holder; 210: first portion; 220: second portion; 300: fastening bolt; 310: head; 320: screw portion; 400: cutting tool; A: axial direction; B: radial direction; C1: first straight line; C2: second straight line; C3: third straight line; D: fourth straight line

The invention claimed is:

1. A cutting insert comprising:
a cylindrical body portion having a first main surface, a second main surface, and an outer circumferential surface, the second main surface being opposite to the first main surface, the outer circumferential surface being continuous to each of the first main surface and the second main surface, the cylindrical body portion being provided with an insertion hole extending between the first main surface and the second main surface;
a cutting portion protruding from the outer circumferential surface in a radial direction; and
a first fitting portion, a second fitting portion, and a third fitting portion each protruding from the second main surface in an axial direction and each extending in respective radial directions, wherein
the first fitting portion, the second fitting portion, and the third fitting portion each being a single projection,
there is no other fitting portion between the first fitting portion and the second fitting portion,
the cutting portion includes a rake face and a flank face continuous to the rake face, and a ridgeline between the rake face and the flank face constitutes a cutting edge,
when viewed in a direction opposite to the axial direction, the cutting portion is provided opposite to the third fitting portion relative to the insertion hole,
when viewed in the direction opposite to the axial direction, a straight line extending through an outer circumferential end of the cutting edge and a center of the insertion hole overlaps with the third fitting portion and is located between the first fitting portion and the second fitting portion, and
when viewed in the direction opposite to the axial direction, a central angle between the second fitting portion and the third fitting portion represents a first central angle, a central angle between the third fitting portion and the first fitting portion represents a second central angle, and a central angle between the first fitting portion and the second fitting portion represents a third central angle, the third central angle is smaller than the first central angle and is smaller than the second central angle, each central angle measured between respective intermediate lines extending from a center of the insertion hole through a respective top surface portion of each fitting portion.

2. The cutting insert according to claim 1, wherein the third central angle is more than or equal to 60° and less than or equal to 100°.

3. The cutting insert according to claim 1, wherein the first central angle is more than or equal to 130° and less than or equal to 150°.

4. The cutting insert according to claim 1, wherein the second central angle is more than or equal to 130° and less than or equal to 150°.

5. The cutting insert according to claim 1, wherein when viewed in the direction opposite to the axial direction, the intermediate line of the third fitting portion is located on a straight line bisecting the third central angle.

6. The cutting insert according to claim 5, wherein the straight line bisecting the third central angle overlaps with the straight line extending through the outer circumferential end of the cutting edge and the center of the insertion hole.

7. The cutting insert according to claim 1, wherein the flank face is continuous to the outer circumferential surface.

8. A cutting tool comprising:
   the cutting insert recited in claim 1;
   a holder provided with a first recess, a second recess, and a third recess, the first recess being configured to receive the first fitting portion, the second recess being configured to receive the second fitting portion, the third recess being configured to receive the third fitting portion; and
   a fastening bolt disposed in the insertion hole and configured to fix the cutting insert to the holder.

9. The cutting tool according to claim 8, wherein
   the first fitting portion has a first side surface portion, a second side surface portion, and the top surface portion, the second side surface portion being opposite to the first side surface portion, the top surface portion being continuous to each of the first side surface portion and the second side surface portion,
   the first recess has a third side surface portion, a fourth side surface portion, and a bottom surface portion, the fourth side surface portion being opposite to the third side surface portion, the bottom surface portion being continuous to each of the third side surface portion and the fourth side surface portion, and
   the first side surface portion is in contact with the third side surface portion, the second side surface portion is in contact with the fourth side surface portion, and the top surface portion is separated from the bottom surface portion.

* * * * *